(12) United States Patent
Jintaseranee et al.

(10) Patent No.: US 9,143,386 B1
(45) Date of Patent: Sep. 22, 2015

(54) REMOTE KEEP-ALIVE MESSAGE MANAGEMENT IN A WIRELESS COMMUNICATION NETWORK

(75) Inventors: Kosol Jintaseranee, San Jose, CA (US); Travis Edward Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1006 days.

(21) Appl. No.: 12/890,766

(22) Filed: Sep. 27, 2010

(51) Int. Cl.
| | | |
|---|---|---|
| *H04L 29/08* | (2006.01) | |
| *H04W 76/04* | (2009.01) | |
| *H04W 76/00* | (2009.01) | |
| *H04L 29/12* | (2006.01) | |

(52) U.S. Cl.
CPC .... *H04L 29/08612* (2013.01); *H04L 29/08576* (2013.01); *H04W 76/045* (2013.01); *H04L 29/08603* (2013.01); *H04L 61/2553* (2013.01); *H04W 76/00* (2013.01)

(58) Field of Classification Search
CPC ..................... H04L 61/2553; H04L 29/08603; H04L 29/08612; H04W 76/045; H04W 76/00
See application file for complete search history.

(56) References Cited

U.S. PATENT DOCUMENTS

| | | | |
|---|---|---|---|
| 7,200,632 B1 * | 4/2007 | Greschler et al. ............. 709/203 |
| 7,539,127 B1 * | 5/2009 | Shaffer et al. ................. 370/216 |
| 7,599,370 B1 * | 10/2009 | Leung et al. .................. 370/392 |
| 7,623,497 B2 | 11/2009 | O'Neill | |
| 7,684,346 B2 * | 3/2010 | Valli ............................. 370/252 |
| 7,768,939 B1 * | 8/2010 | Trivedi et al. ................. 370/252 |
| 7,953,114 B2 * | 5/2011 | Williams et al. .............. 370/473 |
| 8,018,955 B2 * | 9/2011 | Agarwal et al. ............... 370/401 |
| 8,291,258 B2 * | 10/2012 | Narayanaswamy et al. . 714/4.12 |
| 8,339,954 B2 * | 12/2012 | Dahod .......................... 370/231 |
| 8,493,966 B2 * | 7/2013 | Bendelac ...................... 370/352 |
| 8,954,515 B2 * | 2/2015 | Guo et al. ..................... 709/206 |
| 2004/0098622 A1 | 5/2004 | O'Neill | |
| 2008/0232288 A1 * | 9/2008 | Venkatachalam et al. .... 370/311 |
| 2009/0274102 A1 | 11/2009 | O'Neill | |
| 2011/0299454 A1 * | 12/2011 | Krishnaswamy .............. 370/328 |
| 2011/0320589 A1 * | 12/2011 | Hietala ......................... 709/224 |

FOREIGN PATENT DOCUMENTS

WO    WO 2007083000 A1 *   7/2007

* cited by examiner

*Primary Examiner* — Patrice Winder
*Assistant Examiner* — Angela Widhalm (57) ABSTRACT

Systems and methods are provided for managing keep-alive messages remote to a wireless communication device. In a particular embodiment, a method provides receiving an application request from a wireless communication device for an application that transfers keep-alive messages and receiving a first keep-alive message from the application intended for delivery to the wireless communication device. The method further provides processing the first keep-alive message to determine whether a response to the keep-alive message is necessary. If a response to the keep alive message is necessary, transferring a keep-alive message response to the application.

20 Claims, 7 Drawing Sheets

REMOTE KEEP-ALIVE MESSAGE MANAGEMENT IN A WIRELESS COMMUNICATION NETWORK

TECHNICAL BACKGROUND

The typical wireless communication device executes various software applications that obtain services for the user from remote servers. Some of these applications periodically send keep-alive messages to the remote servers to maintain their services. Examples of services that utilize keep-alive messaging include email, social networking, and video streaming—among others. The remote servers shut down the service for the user if they do not receive the expected keep-alive messages.

In some cases, multiple applications concurrently transfer several periodic keep-alive messages. If the timing of these numerous keep-alive messages is distributed, then the wireless communication device may continually transfer keep-alive messages, which drains the battery and leaves less time to handle other communication tasks. The numerous keep-alive messages also consume valuable bandwidth in the wireless communication network.

Overview

Systems and methods are provided for managing keep-alive messages remote to a wireless communication device. In a particular embodiment, a method provides receiving an application request from a wireless communication device for an application that transfers keep-alive messages and receiving a first keep-alive message from the application intended for delivery to the wireless communication device. The method further provides processing the first keep-alive message to determine whether a response to the keep-alive message is necessary. If a response to the keep alive message is necessary, the method further provides transferring a keep-alive message response to the application.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
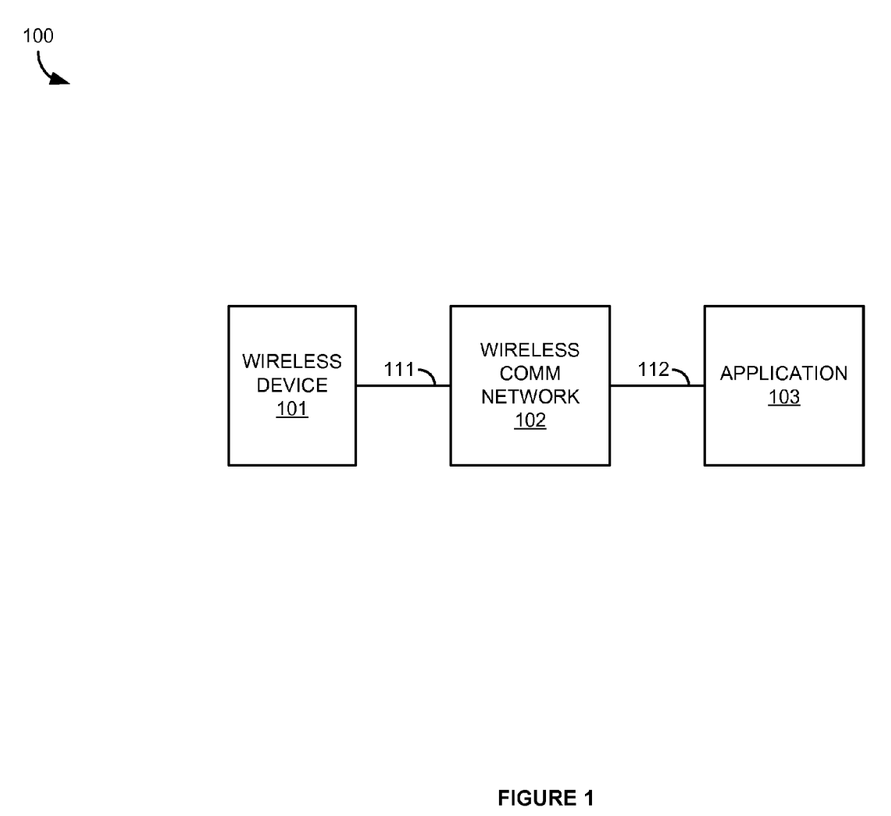
FIG. 1 illustrates a wireless communication system.

FIG. 1 illustrates wireless communication system 100. Wireless communication system 100 includes wireless communication device 101, wireless communication network 102, and application 103. Wireless communication device 101 and wireless communication network 102 communicate over wireless link 111. Wireless communication network 102 and application 103 communicate over communication link 112.

In operation, wireless device 101 is capable of requesting various applications such as audio, video, social networking, gaming, and email over wireless network 102. The applications may support various software modules executing on wireless device 101. For example, a streaming audio application executing on wireless device 101 may access an audio application via wireless network 102 for streaming audio content. In particular, application 103 may support an application software module running on wireless device 101.

After application 103 receives a request for an application service, application 103 begins providing the application service to wireless device 101. While application 103 is providing the service, wireless device 101 may become disconnected, or otherwise no longer requires application 103 to provide the service, without properly stopping application 103 from providing the service. Without an indication to stop service from wireless device 101, application 103 may continue to provide the application service even though wireless device 101 is not available to receive the service.

In order to mitigate the effects of the above scenario, application 103 may transfer keep-alive messages to wireless device 101 while providing the application service. If application 103 receives a response to the keep-alive messages, then application 103 will continue to provide the application service to wireless device 101. If application 103 does not receive a response to the keep-alive messages in an appropriate amount of time, then application 103 will cease providing the application service to wireless device 101. If wireless device 101 responds to the keep-alive messages itself, then the responses use the resources of wireless device 101, such as battery and processor, as well as resources of wireless network 102, such as wireless bandwidth on link 111.

Figure 2:
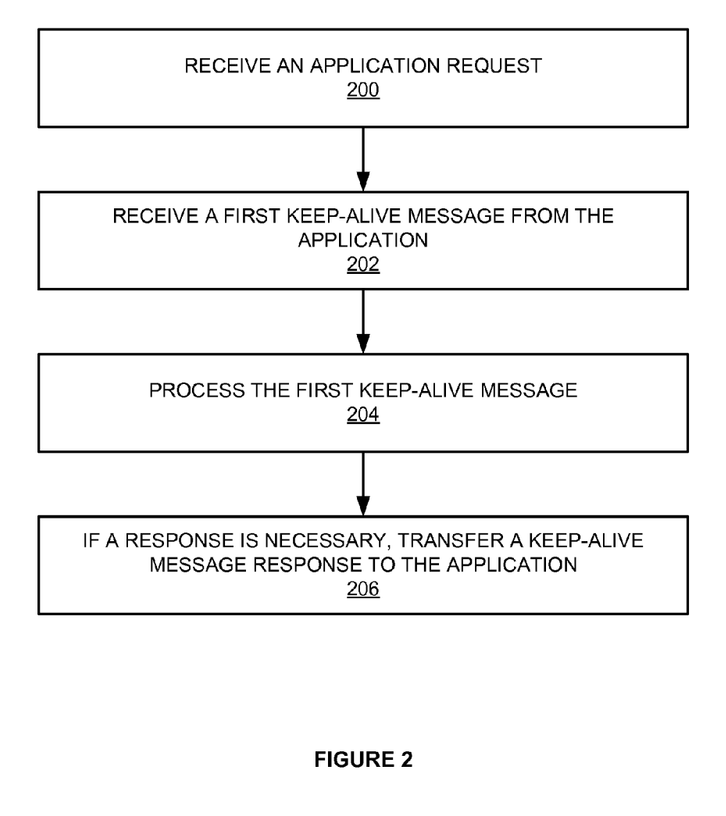
FIG. 2 illustrates the operation of a wireless communication system.

FIG. 2 illustrates the operation of wireless communication system 100. The operation begins with wireless network 102 receiving an application request from a wireless communication device for application 103 that transfers keep-alive messages (step 200). Receiving the application request notifies wireless network 102 that wireless network 102 should monitor for keep-alive messages from application 103 destined for wireless device 101. Application 103 may be a system that provides one or more application services to wireless device 101. The application services may be audio, video, social networking, gaming, email, or any other application service that may be provided over wireless network 102. The application services may be provided in support of a software application module executing on wireless device 101.

Keep-alive messages indicate that application 103 requires a response to the keep-alive messages in order to continue providing the application service to wireless device 101. If a keep-alive message response is not received by application 103 within an amount of time, then application 103 stops providing the application service. After being received by wireless network 102, the application request continues on to application 103 so that application 103 can take the appropriate steps to provide an application service to wireless device 101.

Wireless network 102 then receives a first keep-alive message from application 103 intended for delivery to the wireless communication device (step 202). The first keep-alive message, though intended for wireless device 101, is not received by wireless device 101. Thus, instead of the first keep-alive message being received in wireless device 101, wireless network 102 intercepts the first keep-alive message. Wireless network 102 may monitor all packets to and from wireless device 101 in order to recognize the first keep-alive message from application 103 and recognize the application request from above. The packet monitoring may be performed by a deep packet inspection module.

In some embodiments, wireless network 102 may transfer a message to wireless device 101 informing wireless device 101 that wireless network 102 will handle keep-alive message responses for wireless device 101. Therefore, even if keep-alive messages from application 103 are allowed to reach wireless device 101, wireless device 101 knows that wireless network 102 will handle the responses to the keep-alive messages.

Wireless network 102 processes the first keep-alive message to determine whether a response to the keep-alive message is necessary (step 204). The first keep-alive message may include information such as an indication that application 103 requires a keep-alive message response in order to continue providing the application service, a time limitation for a keep-alive message response, and any other information necessary to generate and transfer an appropriate response to the first keep alive message. Wireless network 102 determines whether a response is necessary by determining whether wireless device 101 still requires the application service from application 103. Wireless device 101 may no longer require the service because wireless device 101 may lost connectivity with wireless network 102, wireless device 101 may have transferred a stop application message to application 103 but application 103 did not receive the message and continues to provide the service, the software module running on wireless device 101 for application 103 may crash, or any other reason that wireless device 101 may no longer require the application service provided by application 103. Wireless device 101 may lose wireless connectivity for a variety of reasons including losing signal reception and loss of power for the device.

If a response to the keep-alive message is necessary, wireless network 102 transfers a keep-alive message response to application 103 (step 206). The keep-alive message response is transferred in accordance with the information provided in the first keep alive message. For example, if a response indicating that wireless device 101 still needs the application service is required within 10 seconds, then wireless network 102 transfers the keep-alive response message within 10 seconds. Otherwise, if wireless network 102 determines that wireless device 101 has lost wireless connectivity, or otherwise no longer requires the application service from application 103, then wireless network 102 does not transfer a keep-alive message response to application 103. Additionally, wireless network 102 may transfer a message indicating that application 103 should close the session providing the service to wireless device 101.

In some embodiments, the first keep-alive message may indicate that a response to the first keep-alive message is necessary periodically while wireless device 101 is being provided the application service. Therefore, after receiving the first keep-alive message from application 103, wireless network 102 may continue to periodically transfer keep-alive message responses until wireless network 102 determines that application 103 no longer needs to provide the application service to wireless device 101. For example, wireless device 101 may lose wireless connectivity or wireless network 102 may receive a message from wireless device 101 closing the application service from application 103.

In other embodiments, application 103 may continue to transfer keep-alive messages that are received by wireless network 102 and not allowed to continue to wireless device 101. Each of those further keep alive messages may need to be responded to individually in order for application 103 to continue to provide the application service.

In some embodiments, wireless network 102 may initially determine that a keep-alive response message is unnecessary. Wireless network 102 may then wait a period of time not longer than the period of time required for response to the keep-alive message to allow wireless device 101 to regain connectivity. Likewise, wireless network 102 may wait the period of time before sending a close session message to application 103.

Wireless network 102 may recognize that wireless device has lost wireless connectivity based on a Mobile Internet Protocol (MIP) event. The MIP event may be some anomaly in the packets sent to or from wireless device 101 that indicate that to wireless network 102 that wireless device 101 is losing or has lost wireless connectivity. Wireless network 102 may also monitor indicators within wireless network 102 that may indicate that wireless device 101 has lost wireless connectivity.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication network 102 is a communication network that comprises telephony switches, wireless access nodes, Internet routers, network gateways, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
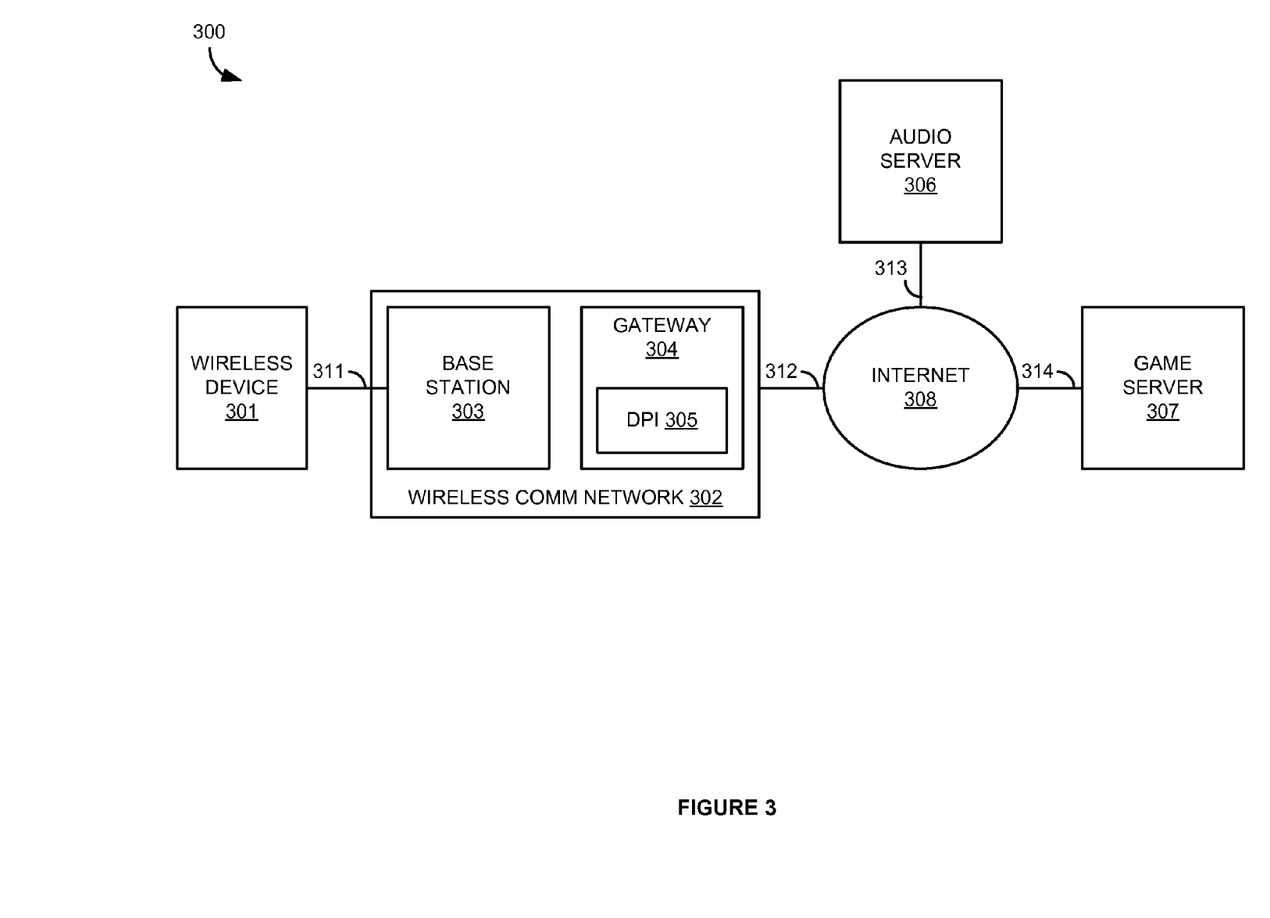
FIG. 3 illustrates a wireless communication system.

FIG. 3 illustrates wireless communication system 300. Wireless communication system 300 includes wireless communication device 301, wireless communication network 302, audio server 306, game server 307, and Internet 308. Wireless communication network 302 includes base station 303 and communication gateway 304. Communication gateway 304 includes deep packet inspection module 305. Wireless device 301 and base station 303 communicate over wireless link 311. Wireless communication network 302 and Internet 308 communicate over communication link 312. Internet 308 and audio server 306 communicate over communication link 313. Internet 308 and game server 307 communicate over communication link 314.

In operation, wireless device 301 is capable of executing various software modules that allow wireless device 301 to access application services from audio server 306 and game server 307. For example, a streaming audio application or Internet browser on wireless device 301 may access streaming audio content on audio server 306 and a game application on wireless device 301 may access game content on game server 307. Both audio server 306 and game server 307 require keep-alive message responses from wireless device 301 in order to continue providing their respective services to wireless device 301.

Figure 4:
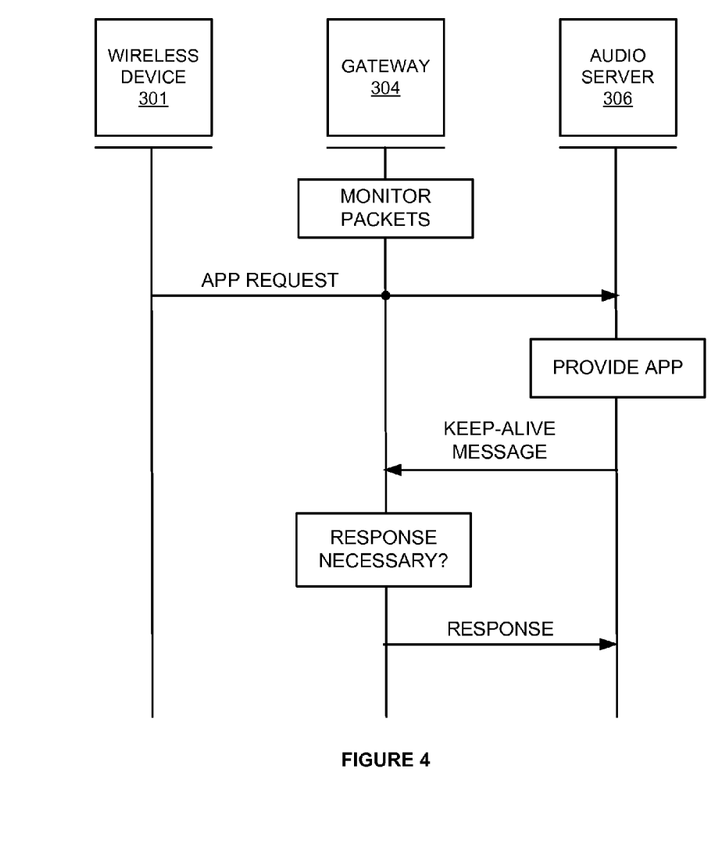
FIG. 4 is a sequence diagram illustrating the operation of a wireless communication system.

FIG. 4 is a sequence diagram illustrating the operation of wireless communication system 300. The sequence begins with deep packet inspection module 305 of gateway 304 monitoring packets exchanged by wireless device 301. The packets are monitored in order to recognize application service requests from wireless device 301. A user of wireless device 301 executes a streaming audio application on wireless device 301 and indicates in the application a desired audio stream. Wireless device 301 transfers a request for an audio application service that provides the requested audio stream to audio server 306. The packets for the application request are received in gateway 304, deep packet inspection module 305 determines that packets contain an application request, and the request is allowed to continue to audio server 306.

Upon receiving the audio service request, audio server 306 takes the necessary steps to provide the audio application service requested by wireless device 301. Audio server 306 then provides the audio stream to wireless device 301. After service begins, audio server 306 then transfers a first keep-alive message that indicates that audio server 306 must receive keep-alive message responses in order to continue providing the audio stream to wireless device 301. The first keep-alive message is intended for wireless device 301 but is instead detected by deep packet inspection module 305 in gateway 304 and not allowed to continue to wireless device 301.

Gateway 304 then determines whether a response to the first keep-alive message is necessary and how any response should be sent. In this example, the keep-alive message response must be sent within 10 seconds in order to indicate to audio server 306 that the audio stream should continue. Gateway 304 determines that wireless device 301 still requires the audio stream from audio server 306 and, thus, a keep-alive message response is necessary. Gateway 304 may make this determination based on the lack of a MIP event indicating that wireless device 301 has lost connectivity, based on information from other systems within wireless network 302, such as base station 303, that indicates that wireless device 301 is still connected to wireless network 302, or any other indications that wireless device 301 does or does not still require the audio stream from audio server 306.

Since gateway 304 determines that a keep-alive message response is necessary, gateway 304 transfers a keep-alive message response to audio server 306. The keep-alive message response is transferred in accordance with any instructions provided in the keep-alive message from audio server 306, including the 10 second time limitation. Audio server 306 continues to provide the audio stream application service to wireless device 301.

The first keep-alive message may have indicated that periodic keep-alive message responses, such as one every 10 seconds, are required for the audio stream service to continue. In that situation, gateway 304 may continue to transfer subsequent periodic keep-alive message responses to audio server 306 in order to maintain the audio stream. The keep-alive message responses will continue until gateway 304 determines that responses are no longer necessary, as would be the case if wireless device 301 loses wireless connectivity, or wireless device 301 indicates that the audio stream should be stopped. Alternatively, audio server 306 may only require responses to individual keep-alive messages and gateway 304 makes a response determination on an individual keep-alive message basis.

Figure 5:
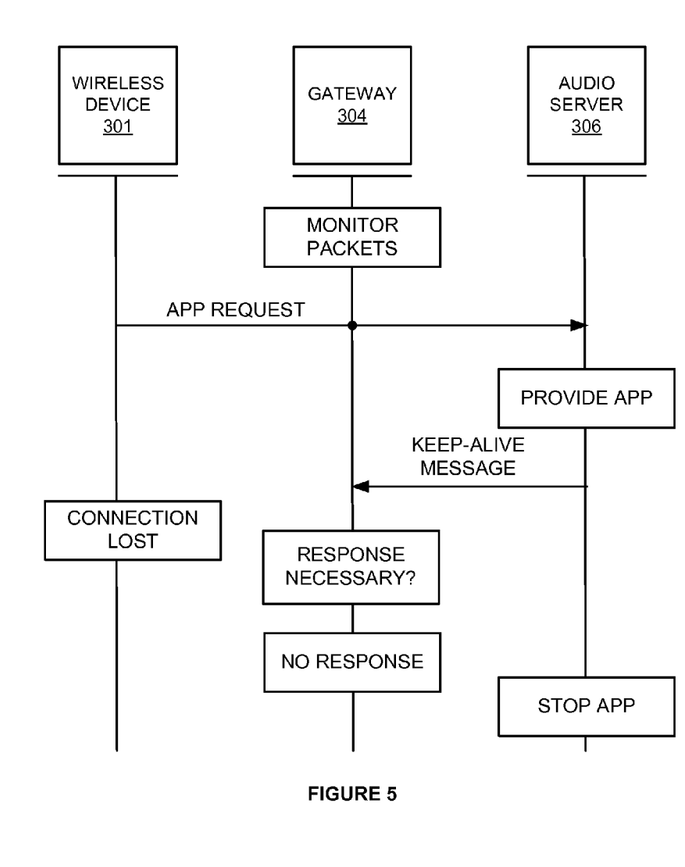
FIG. 5 is a sequence diagram illustrating the operation of a wireless communication system.

FIG. 5 is a sequence diagram illustrating the operation of wireless communication system 300. The sequence begins with deep packet inspection module 305 of gateway 304 monitoring packets exchanged by wireless device 301. The packets are monitored in order to recognize application service requests from wireless device 301. A user of wireless device 301 executes a streaming audio application on wireless device 301 and indicates in the application a desired audio stream. Wireless device 301 transfers a request for an audio application service that provides the requested audio stream to audio server 306. The packets for the application request are received in gateway 304, deep packet inspection module 305 determines that packets contain an application request, and the request is allowed to continue to audio server 306.

Upon receiving the audio service request, audio server 306 takes the necessary steps to provide the audio application service requested by wireless device 301. Audio server 306 then provides the audio stream to wireless device 301. After service begins, audio server 306 transfers a first keep-alive message that indicates that audio server 306 must receive keep-alive message responses in order to continue providing the audio stream to wireless device 301. The first keep-alive message is intended for wireless device 301 but is instead detected by deep packet inspection module 305 in gateway 304 and not allowed to continue to wireless device 301.

Gateway 304 then determines whether a response to the first keep-alive message is necessary and how any response should be sent. In this example, the keep-alive message response must be sent within 10 seconds in order to indicate to audio server 306 that the audio stream should continue. At some point after the audio stream starts from audio server 306, wireless device 301 loses wireless connectivity with wireless network 302. Therefore, gateway 304 determines that wireless device 301 no longer requires the audio stream from audio server 306 and, thus, a keep-alive message response is not necessary. Gateway 304 may make this determination based on a MIP event indicating that wireless device 301 has lost connectivity, based on information from other systems within wireless network 302, such as base station 303, that indicates that wireless device 301 is no longer connected to wireless network 302, or any other indications that wireless device 301 does or does not still require the audio stream from audio server 306.

Since gateway 304 determines that a keep-alive message response is not necessary, gateway 304 does not transfer a keep-alive message response to audio server 306. When no response is received to the first keep-alive message is received within the 10-second limit, audio server 306 stops providing the audio stream application service to wireless device 301.

In some embodiments, wireless device 301 may not lose wireless connectivity before the first keep-alive message response is transferred, as with the example above for FIG. 5. Instead, the first keep-alive message may have indicated that periodic keep-alive message responses, such as one every 10 seconds, are required for the audio stream service to continue. In that situation, gateway 304 may transfer periodic keep-alive message responses to audio server 306 in order to maintain the audio stream. The keep-alive message responses will continue until gateway 304 determines that responses are no longer necessary because wireless device 301 loses wireless connectivity before one of these subsequent keep-alive message responses. Alternatively, audio server 306 may only require responses to individual keep-alive messages and gateway 304 makes a response determination on an individual keep-alive message basis.

Figure 6:
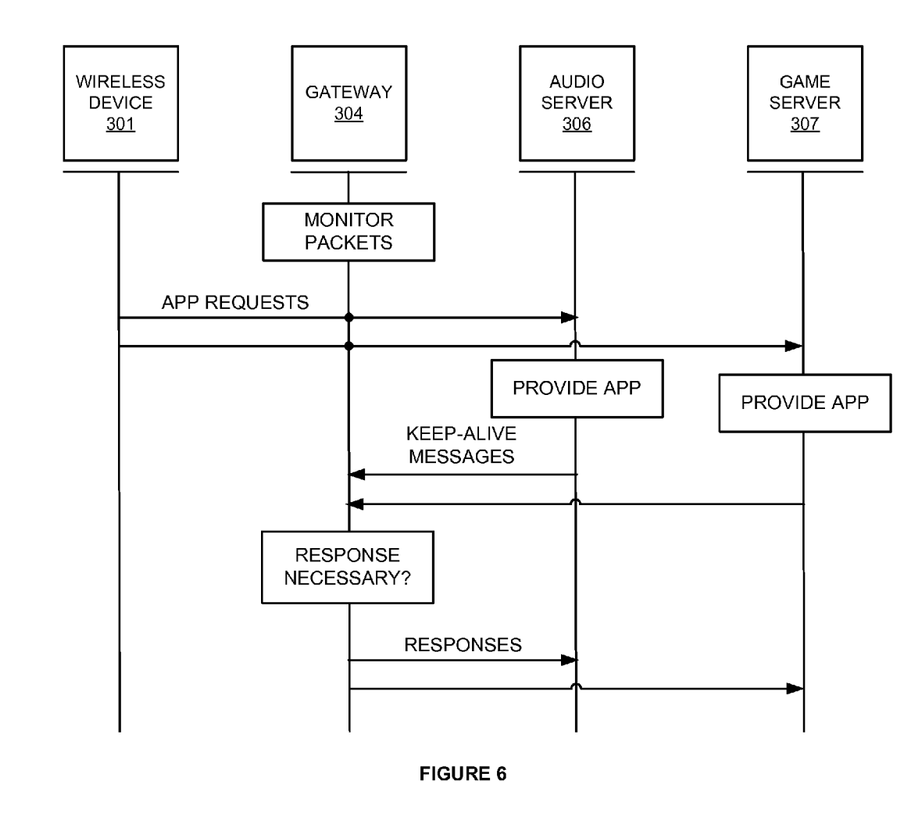
FIG. 6 is a sequence diagram illustrating the operation of a wireless communication system.

FIG. 6 is a sequence diagram illustrating the operation of wireless communication system 300. The sequence begins with deep packet inspection module 305 of gateway 304 monitoring packets exchanged by wireless device 301. The packets are monitored in order to recognize application service requests from wireless device 301. A user of wireless device 301 executes a streaming audio application on wireless device 301 and indicates in the application a desired audio stream. The user also executes a game application on wireless device 301 that requires a support service, such as multiplayer functionality, from game server 307. Wireless device 301 transfers a request for an audio application service that provides the requested audio stream to audio server 306. Wireless device 301 also transfers a request for a game application service to game server 307. The packets for the application requests are received in gateway 304, deep packet inspection module 305 determines that packets contain two application requests, and the requests are allowed to continue to audio server 306 and game server 307, respectively.

Upon receiving the audio service request, audio server 306 takes the necessary steps to provide the audio application service requested by wireless device 301. Audio server 306 then provides the audio stream to wireless device 301. Likewise, upon receiving the gaming service request, game server 307 takes the necessary steps to provide the gaming application service requested by wireless device 301. Game server 307 then provides the gaming service to wireless device 301. After service begins, audio server 306 and game server 307 each then transfers a first keep-alive message that indicates that both audio server 306 and game server 307 must receive keep-alive message responses in order to continue providing the audio stream and gaming service to wireless device 301. The first keep-alive messages are intended for wireless device 301 but are instead detected by deep packet inspection module 305 in gateway 304 and not allowed to continue to wireless device 301.

Gateway 304 then determines whether responses to the first keep-alive messages are necessary and how any responses should be sent. In this example, the keep-alive message responses must be sent within 10 seconds in order to indicate to audio server 306 that the audio stream should continue. Gateway 304 determines that wireless device 301 still requires the audio stream from audio server 306 and the gaming service from game server 307 and, thus, a keep-alive message response is necessary for each server. Gateway 304 may make this determination based on the lack of a MIP event indicating that wireless device 301 has lost connectivity, based on information from other systems within wireless network 302, such as base station 303, that indicates that wireless device 301 is still connected to wireless network 302, or any other indications that wireless device 301 does or does not still require the audio stream from audio server 306 and gaming service from game server 307.

Since gateway 304 determines that keep-alive message responses are necessary, gateway 304 transfers a keep-alive message response to audio server 306 and a keep-alive message response to game server 307. The keep-alive message responses are transferred in accordance with any instructions provided in the keep-alive message from audio server 306 and game server 307, respectively, including the 10 second time limitation. Audio server 306 continues to provide the audio stream application service to wireless device 301 and game server 307 continues to provide the gaming service to wireless device 301.

The first keep-alive messages may have indicated that periodic keep-alive message responses, such as one every 10 seconds, are required for either or both audio server 306 and game server 307. In that situation, gateway 304 may continue to transfer subsequent periodic keep-alive message responses to audio server 306 and game server 307 in order to maintain the respective services. The keep-alive message responses will continue until gateway 304 determines that responses are no longer necessary, as would be the case if wireless device 301 loses wireless connectivity, or wireless device 301 indicates that the audio stream should be stopped. Alternatively, audio server 306 may only require responses to individual keep-alive messages and gateway 304 makes a response determination on an individual keep-alive message basis.

Figure 7:
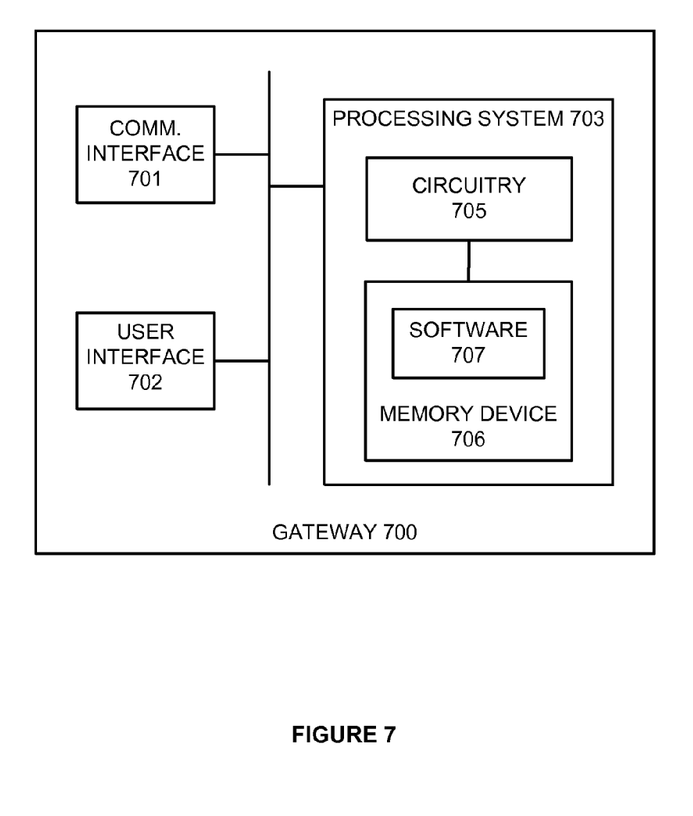
FIG. 7 illustrates a communication gateway.

FIG. 7 illustrates communication control system 700. Communication control system 700 is an example of communication control system 103, although control system 103 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate communication control system 700 as described herein.

In particular, operating software 707 contains a software module that directs processing system 703 to receive via communication interface 701 an application request from a wireless communication device for an application that transfers keep-alive messages. Another module directs processing system 703 to receive via communication interface 701 a first keep-alive message from the application intended for delivery to the wireless communication device. A further module directs processing system 703 to process the first keep-alive message to determine whether a response to the keep-alive message is necessary. If a response to the keep alive message is necessary, the module directs processing system 703 to transfer via communication interface 701 a keep-alive message response to the application.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    in a wireless communication network that provides network access to a wireless communication device:
        receiving an application request from the wireless communication device for application content provided by an application server that transfers keep-alive messages, wherein the application server also receives the application request and, in response to the application request, provides the application content to the wireless communication device over the wireless communication network;
        while the application server is providing the application content to the wireless communication device, receiving a first keep-alive message from the application server intended for delivery to the wireless communication device;
        determining whether a response to the first keep-alive message is necessary for the application server to continue providing the application content;
        upon determining that a response to the first keep-alive message is necessary, transferring a keep-alive message response to the application server on behalf of the wireless communication device.

2. The method of claim 1 further comprising monitoring packets directed to and transferred from the wireless communication device.

3. The method of claim 2 further comprising recognizing the application request and the first keep-alive message from the packets directed to and transferred from the wireless communication device.

4. The method of claim 2 wherein the monitoring is performed by a deep packet inspection module.

5. The method of claim 1 wherein a response to the first keep-alive message is necessary if the mobile device has not lost wireless connectivity and has not transferred a close session message to the application.

6. The method of claim 1 further comprising, if the wireless communication device loses wireless connectivity, transferring a close session message to the application.

7. The method of claim 6 further comprising waiting a period of time before transferring the close session message.

8. The method of claim 7 further comprising transferring the keep-alive message response if the wireless communication device regains wireless connectivity before the period of time elapses.

9. The method of claim 1 further comprising informing the wireless communication device that the wireless communication network will be performing keep-alive functions on behalf of the wireless communication device.

10. The method of claim 1 wherein the first keep-alive message, the keep-alive message response, and the application request are sent using a packet based protocol.

11. A wireless communication system comprising:
    a wireless communication device configured to transfer an application request for application content provided by an application server that transfers keep-alive messages;
    a wireless communication network configured to receive the application request, wherein the application server also receives the application request and, in response to the application request, provides the application content to the wireless communication device over the wireless communication network, receive a first keep-alive message from the application server intended for delivery to the wireless communication device while the application server is providing the application content to the wireless communication device, determine whether a response to the first keep-alive message is necessary for the application server to continue providing the application content, and, upon determining that a response to the first keep-alive message is necessary, transfer a keep-alive message response to the application server on behalf of the wireless communication device.

12. The system of claim 11 wherein the wireless communication network is further configured to monitor packets directed to and transferred from the wireless communication device.

13. The system of claim 12 wherein the wireless communication network is further configured to recognize the application request and the first keep-alive message from the packets directed to and transferred from the wireless communication device.

14. The system of claim 12 wherein the wireless communication network comprises a deep packet inspection module configured to perform the monitoring.

15. The system of claim 11 wherein a response to the first keep-alive message is necessary if the mobile device has not lost wireless connectivity and has not transferred a close session message to the application.

16. The system of claim 11 wherein the wireless communication network is further configured to, if the wireless communication device loses wireless connectivity, transfer a close session message to the application.

17. The system of claim 16 wherein the wireless communication network is further configured to wait a period of time before transferring the close session message.

18. The system of claim 17 wherein the wireless communication network is further configured to transfer the keep-alive message response if the wireless communication device regains wireless connectivity before the period of time elapses.

19. The system of claim 11 further comprising informing the wireless communication device that the wireless communication network will be performing keep-alive functions on behalf of the wireless communication device.

20. A communication gateway system comprising:
    a communication interface configured to receive an application request from a wireless communication device for application content provided by an application server that transfers keep-alive messages, wherein the application server also receives the application request and, in response to the application request, provides the application content to the wireless communication device over the wireless communication network, and receive a first keep-alive message from the application server intended for delivery to the wireless communication device while the application server is providing the application content to the wireless communication device;

a processing system configured to determine whether a response to the first keep-alive message is necessary for the application server to continue providing the application content;

the communication interface further configured to, upon determining that a response to the first keep-alive message is necessary, transfer a keep-alive message response to the application server on behalf of the wireless communication device.

\* \* \* \* \*